Oct. 27, 1931. G. KNOPP 1,829,660
MACHINE FOR MANUFACTURING MULTIPLE COURSE
PAPERS, CARDBOARDS, AND THE LIKE
Filed Oct. 10, 1929 5 Sheets-Sheet 1

G. Knopp INVENTOR

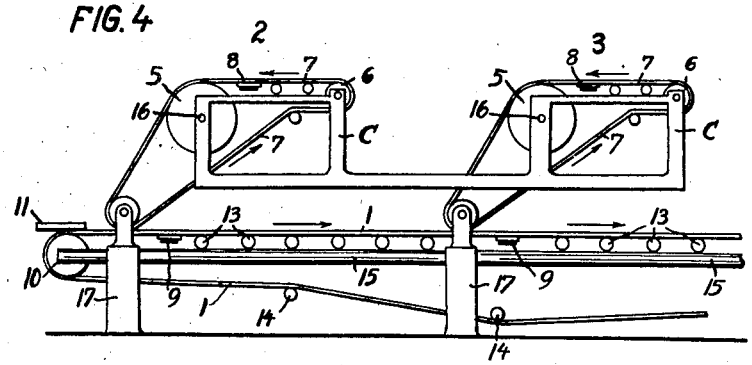
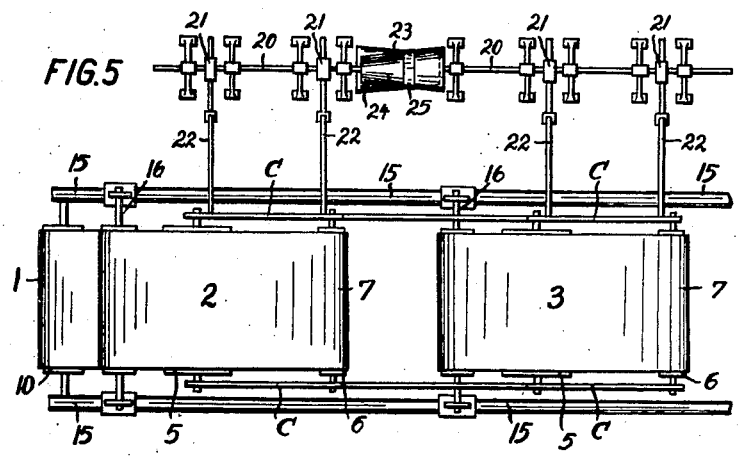
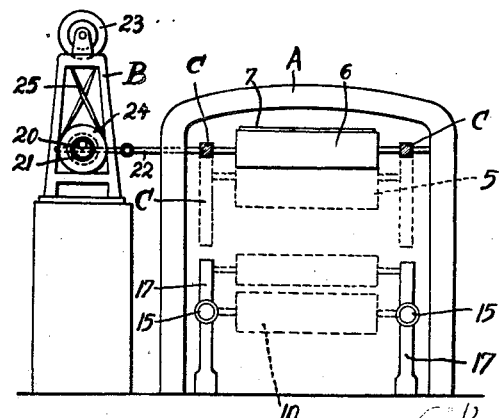

Oct. 27, 1931.      G. KNOPP      1,829,660
MACHINE FOR MANUFACTURING MULTIPLE COURSE
PAPERS, CARDBOARDS, AND THE LIKE
Filed Oct. 10, 1929      5 Sheets-Sheet 3

G. Knopp INVENTOR

By Marks & Clerk
ATTys.

Oct. 27, 1931.  G. KNOPP  1,829,660
MACHINE FOR MANUFACTURING MULTIPLE COURSE
PAPERS, CARDBOARDS, AND THE LIKE
Filed Oct. 10, 1929    5 Sheets-Sheet 5
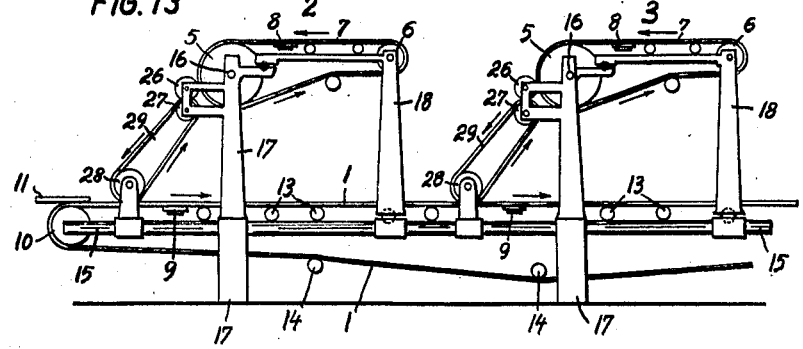
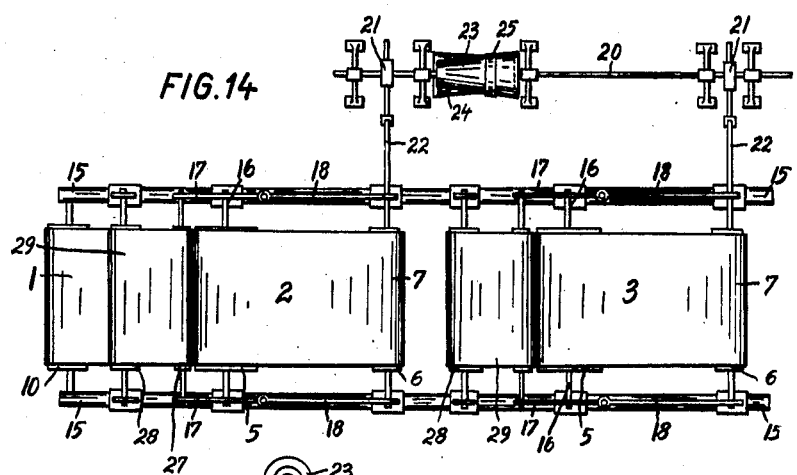
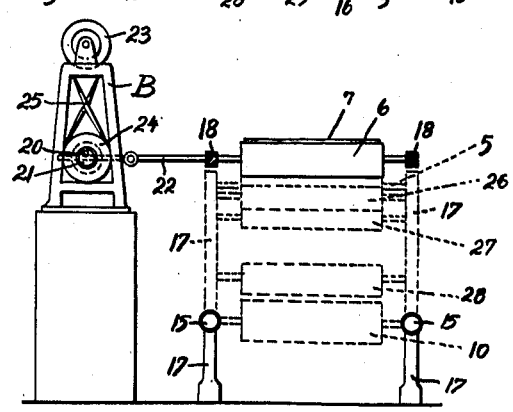

Patented Oct. 27, 1931

1,829,660

UNITED STATES PATENT OFFICE

GUMAL KNOPP, OF BERLIN-WILMERSDORF, GERMANY

MACHINE FOR MANUFACTURING MULTIPLE-COURSE PAPERS, CARDBOARDS, AND THE LIKE

Application filed October 10, 1929, Serial No. 398,713, and in Germany November 21, 1924.

The invention relates to a process and longitudinal sieve paper-machine for manufacturing multiple course papers, cardboards and the like, provided with several upper, independent sieve-aggregates. Such a machine forms for instance the subject matter of American patent-application Ser. No. 4,250, filed January 23, 1925, now Patent 1,727,162, granted September 3, 1929. The lower longitudinal sieve is therein however made as shaking sieve-element and the compensating shaking of this longitudinal sieve is only effected after the last, upper shaking machinery aggregate. The nature of the present invention on the other hand consists therein, that the lower longitudinal sieve is non-shaking, i. e. stationary, while the upper, independent working paper-machinery-aggregates possess normal shaking. Compensating shaking is hereby effected between the single independent working machinery-aggregates and the lower, non-shaking longitudinal sieve. This compensating shaking can for instance be effected in an extension of the upper sieve, or a specially installed intermediate element between the shaking, upper sieve and a nonshaking lower longitudinal sieve.

The construction of the machine according to the present invention renders it possible, to manufacture multiple-course papers, cardboards or the like with a flaky covering-layer, whereby the lower, non-shaking, longitudinal sieve must contain the covering-layer, upon which the paper-layers of the upper sieves are placed consecutively. A multiple course product is hereby obtained, the lowermost layer of which (covering-layer) has been produced by non-shaking, while the other layers are made with any desired shaking. The layer of material upon the lower, longitudinal sieve, can of course be omitted. In this case, only the layers of the upper sieves would be placed upon one another and a multiple course product would be obtained, the layers of which have been made by any desired shaking.

Figure 1:
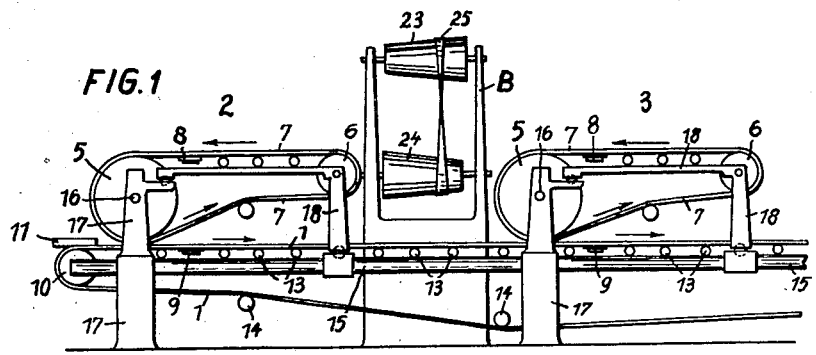
Figure 2:
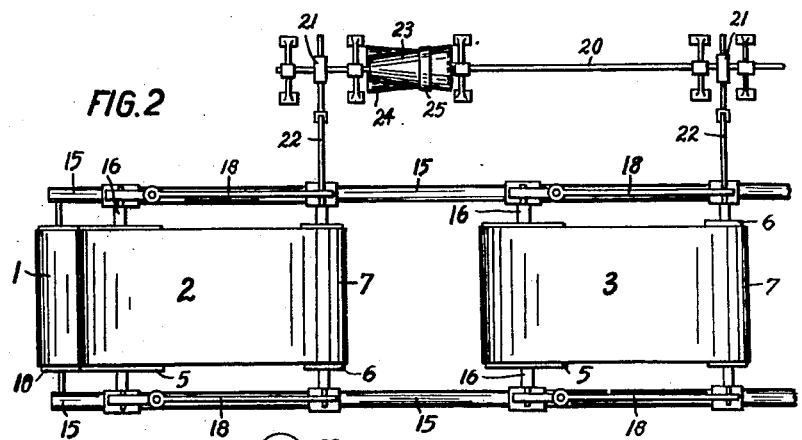
Figure 3:
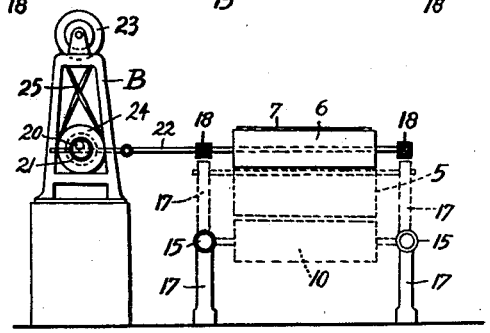

Five different embodiments of the invention are illustrated in the accompanying drawings and, Figure 1 is a side-view of the machine,
Figure 2 a plan of the same,
Figure 3 a cross-section of one construction, while
Figures 4–6, respectively, 7–9, respectively, 10–12, respectively, 13–15 show the other embodiments of the invention by corresponding illustrations.

Like reference-marks indicate like parts in all figures.

Reference numeral 1 is the lower, longitudinal sieve, made non-shaking, i. e. stationary and at the under side of its upper course is provided with suction-boxes. 10 is the front roller, 11 the sieve-table of the lower longitudinal sieve or so-called Fourdrinier wire 1, provided with register-rollers 13 and register-rails 15, and guided with its lower course around the sieve-guiding tension-rollers 14, while the register-rails are firmly connected with rigid, non-shaking support or frames 17 which are attached firmly to the floor, so that the lower, longitudinal sieve cannot shake.

The circular sieve-rolls 5 of the upper, independent working machinery-aggregates 2 and 3 are, by the pivots 16 supported in the frames 17. Instead of two upper aggregates, more than two might be of course arranged consecutively. 6 indicates the front roller, 7 the sieve and 8 the suction-boxes one for each upper aggregate each. The register-rails 18 with the support of the segment-like shaking-part (compensating-shaking) are linked to the supports 17. For supporting the shaking-device, a frame or bracket B has been provided. This device comprises a continuous shaft 20, upon which a cone-pulley 24 is mounted, driven by a belt 25 from another cone-pulley 23, supported by the bracket B, which pulley 23 is driven by any suitable means (not illustrated). The shaft 20 carries further an eccentric 21, acting upon the shaking-bars 22, engaging the register-rails 15 and bearing 18 of the upper machinery-aggregates, as shown in Figs. 2 and 3.

In Figs. 4, 5 and 6, the upper shaking sieves 2 and 3 are suspended on a frame A, as far as they are shaking parallel. The two upper machinery-aggregates 2 and 3 are further connected by a frame C and this frame is engaged by the shaking-bars 22 (instead of by the register-rails of the upper sieves as shown in Figs. 1, 2 and 3). Each upper sieve (2 or 3) can practically be arranged so that it will be possible to work with several shaking-brackets B, see Figs. 1 and 3 and thereby impart to each upper sieve a special shaking. The upper sieves 2, 3 are extended downwardly over the cylinders 5 for enabling the compensating shaking and each passed over one roller on the support 17 (Fig. 4).

Figure 7:
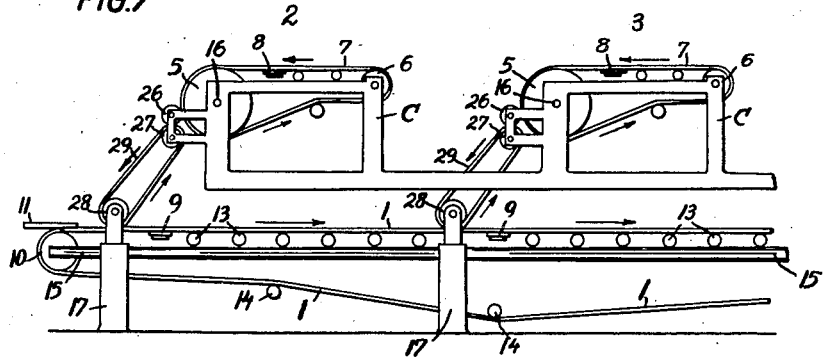
Figure 8:
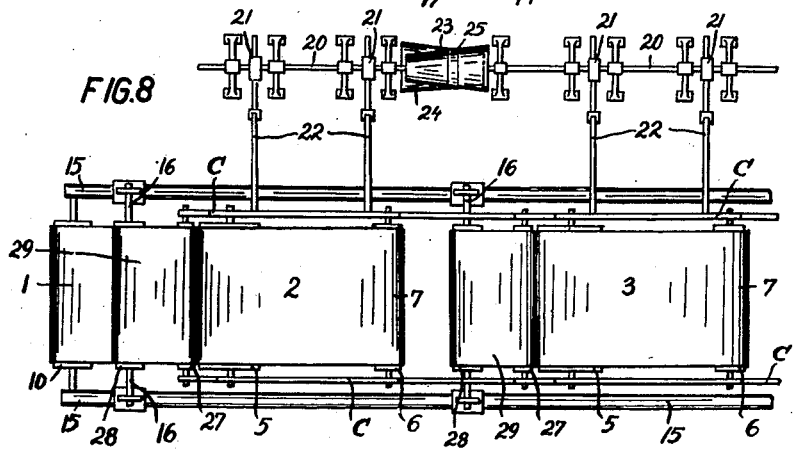
Figure 9:
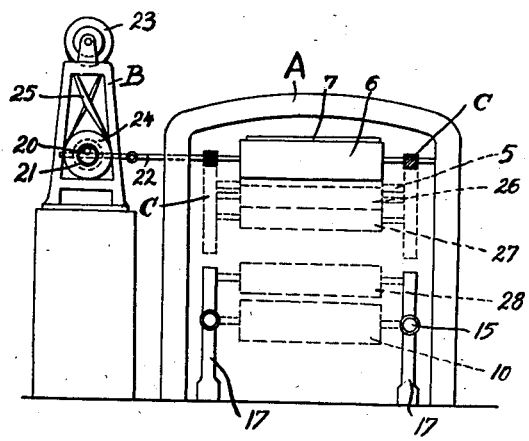

The frame A is required, if the compensating shaking is effected, as shown in Figs. 4, 5 and 6, in an extension of the upper sieve or, as shown in Figs. 7, 8 and 9, in a separate, independently working, intermediate element. The latter replaces therefore the extension of the upper sieve and is installed between the lower non-shaking longitudinal sieve 1 and the cylinder 5 of the upper shaking-sieves 2 and 3. It consists of two upper press-rollers 26 and 27, one lower roller 28 and one sieve 29. Each roller 26 contacts with the respective sieve-cylinder 5 of the upper sieve 2, or 3, in order to guide the paper-course of the respective upper sieve, while the lower roller 28 places the material, coming from the respective upper sieves, upon the longitudinal sieve 1.

Figure 10:
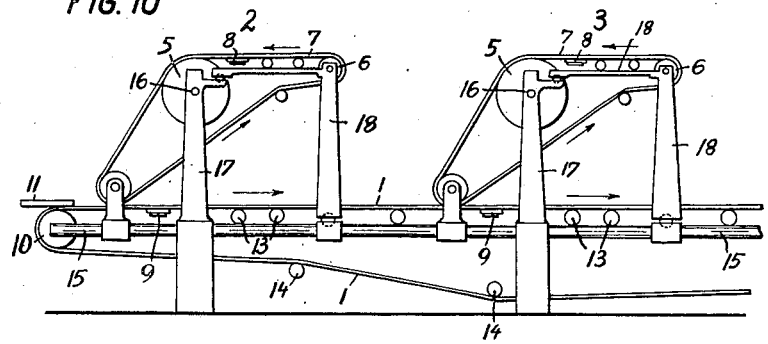
Figure 11:
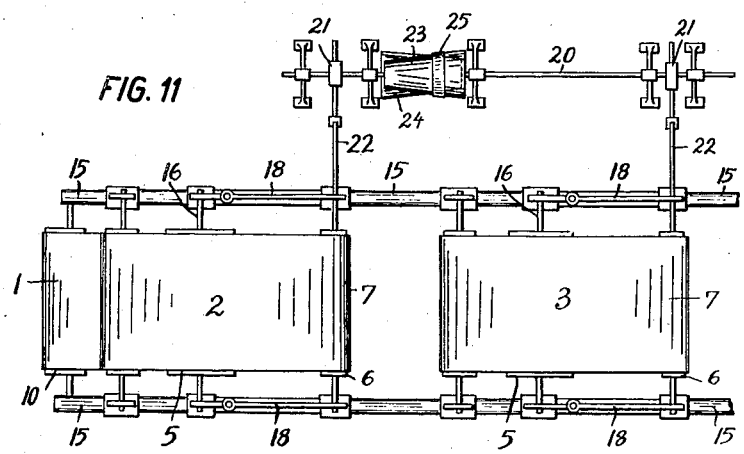
Figure 12:
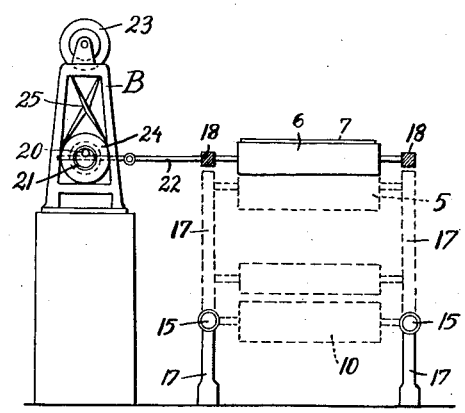

The shaking-bars 22 engage as before with the frame C, and the roller 27 joins the sieve 29 in the shaking of the respective upper sieve, as this roller 27 is supported with the entire upper sieve in the frame C, while the roller 28 is stationary and non-shaking, being attached to the register-rails 15 of the lower non-shaking longitudinal sieve. From the stand-point of compensating-shaking the machine according to Figs. 10, 11 and 12 differs from the machine according to Figs. 4, 5 and 6, just the same as the machine according to Figs. 13, 14 and 15 differs from the one according to Figs. 7, 8 and 9 namely thereby, that the register-rails 18 of the upper sieves instead of the frame C are provided and engaged by the shaking-bars 22. The sieve-cylinders 5 of the upper sieves 2 and 3 are furthermore supported with the axles 16 (Figs. 10-12) and the rollers 26, 27 of the intermediate elements (Figs. 13-15) by the correspondingly raised supports 17 of the lower longitudinal sieve 1. In this case, the frame A is of course superfluous for supporting the upper sieves.

I claim:

1. In a multiple wire paper-machine, the combination with a Fourdrinier wire and a rigid support therefor, of a plurality of individual upper wire units; each of said units comprising a movable frame and a rigid support therefor, an upper wire and rollers in said frame; means for shaking each upper wire unit independent of the Fourdrinier wire through the intermediary of said frame, and other means directing the delivery of pulp from each upper wire to the Fourrinier wire.

2. In a multiple wire paper-machine as described in claim 1 in which said other means include corresponding rollers revolubly mounted in each of said frames and in said support and a connecting belt between the respective rollers.

In testimony whereof I affix my signature.

Dr. Ing. GUMAL KNOPP.